Dec. 8, 1959     J. M. O'DONNELL     2,916,371
TEMPERATURE CONTROL PROCESS FOR MAKING UREA
FORMALDEHYDE FERTILIZER COMPOSITIONS
Filed Oct. 26, 1956

INVENTOR
JAMES M. O'DONNELL
BY
ATTORNEY 2,916,371
Patented Dec. 8, 1959

2,916,371
TEMPERATURE CONTROL PROCESS FOR MAKING UREA FORMALDEHYDE FERTILIZER COMPOSITIONS

James M. O'Donnell, Woonsocket, R.I.

Application October 26, 1956, Serial No. 618,521

5 Claims. (Cl. 71—28)

This invention relates to improvements in the production of fertilizer compositions and more specifically it is directed to an improved process for the production of solid urea-formaldehyde fertilizer compositions in which nitrogen is agronomically available for plant use.

The present application is a continuation-in-part of O'Donnell, Serial No. 513,379, filed June 6, 1955, now Patent No. 2,830,036, dealing with a three-stage heat-cool-heat cycle for the production of urea-form fertilizers.

PRIOR ART

The urea-formaldehyde fertilizer compositions produced by the present process are well known in the art and are commonly known as urea-form products—"Urea-Form—New Nitrogen Fertilizer," Clark, K. G., Crops & Soils, vol. 4, No. 8 (1952). Such solid fertilizers are conventionally produced in an acid catalyzed polymerization reaction in which the liquid reactant mol ratio of urea/formaldehyde is >1 and generally has an optimum value of 1.2 to 1.5. It is thought that the predominance of the urea reactant in the optimum range is a factor influencing the utility of the products by suppression of cyclic and cross-linked polymers unusable for fertilizers. Also, the acid catalyst process generally distinguishes the urea-form fertilizers from the highly insoluble urea formaldehyde resins of the plastics field commonly found in resin scrap. The U.S. Patent 2,415,996, Rohner, and Canadian Patent 419,422, Keenan, describe typical urea-form fertilizer compositions.

A well recognized advantage of urea-formaldehyde or urea-form fertilizers (Nitroform) is that the insoluble plant food nitrogen bound up in the solid polymer becomes slowly available in soil as plant sustenance by the general reaction:

Urea→ammonia→nitrogen or nitrates

The key characteristic of the slowly available nitrogen is expressed as the "availability index of cold water-insoluble nitrogen" and the currently accepted test is based upon the percentage of the cold water-insoluble nitrogen that dissolves in a hot aqueous phosphate solution "Urea-Formaldehyde Fertilizers," Kralovec, R. D., and Morgan, W. A., Agriculture and Food Chemistry, vol. 2, No. 2, pp. 92–94 (1954); "Report of the Subcommittee, Recommendations of the Referee, Nitrogen Activity Index," Smith, J. B.; J.A.O.A.C., vol. 38, No. 1, p. 64 (1955). An availability index of 40% or greater for insoluble but slowly available nitrogen when calculated by the following formula is deemed satisfactory for urea-form products and serves to distinguish the urea-form fertilizer products from resin scrap whose availability index has been found to range from 2% to 10% (Official Publication A.A.F.C.O., No. 8 (1954), p. 14 (N–o–16 urea formaldehyde fertilizer materials).

$$AI = \frac{(\text{Percent } CW_{IN} - HW_{IN}) \times 100}{\text{Percent } CW_{IN}}$$

where $AI$ = availability index
$CW_{IN}$ = cold water ($25° \pm 2°$ C.)-insoluble nitrogen
$HW_{IN}$ = hot-buffer phosphate-insoluble nitrogen The more rapidly the nitrogen nitrifies, the higher the availability becomes. The buffer solution is a mixture of $KH_2PO_4$ and $K_2HPO_4$ phosphates.

The AI test, generally known as the Kralovec-Morgan phosphate test (1954) referred to above, has found acceptance in the fertilizer industry but has been questioned by its lack of consideration of the full problem of availability. It is noted that the AI method considers only the ($CW_{IN}$) cold water-insoluble portion of the urea-form and neglects to consider that portion of urea-form which is soluble in cold water and which may represent between 20 and 40 percent of the polymer composition.

Accordingly a test, known as the TA or total availability test, has been proposed using the same hot buffered phosphate solutions employed in the AI test. It has been found for urea-forms that, by the following formula, the TA value should be at least 80 and that, practically, the CWS value should be less than 40:

$$TA = \frac{\text{Percent } HWS - \text{Percent } CWS}{\text{Percent } CWS} \times 100$$

where $TA$ = total nitrogen available
$CWS$ = Cold water-soluble nitrogen ($25°$ C. $\pm 2°$ C.)
$HWS$ = hot-buffer soluble nitrogen The TA value is reflective of the total nitrogen which becomes available during the growing season (e.g., six months) in average soils containing average moisture and soil bacteria for nitrification capacity.

Heretofore and hereinafter the terms "solid urea-formaldehyde fertilizer composition," "urea-form," "solid urea-formaldehyde polymer," and similar language are intended and defined to be acid catalyzed reaction products of urea and formaldehyde of mol ratio urea/formaldehyde >1, containing at least 35% nitrogen largely in insoluble but slowly available form. The water-insoluble nitrogen in these products tests not less than 40% active by the Kralovec-Morgan phosphate test (1954) and generally the nitrogen is agronomically available for plant use, and the TA value or total availability of nitrogen tested at least 80%.

Furthermore, the term "liquid mix," "urea-formaldehyde solution" and similar language is intended to cover mixtures and monomeric solutions of urea and formaldehyde wherein both the dilute solution of formaldehyde, such as the conventional 37%, concentrated solutions of formaldheyde, such as 60% formaldehyde, or as in the process disclosed in Re. 23,174, Kvalnes, involving the preformation of dimethylol ureas. Both crystalline urea and aqueous urea are included within the purview of this invention.

Among the factors affecting the availability index (AI) which is a measure of the economic utility of solid urea-form fertilizer compositions are such processing variables as the urea-formaldehyde reactant mole ratio, the pH, the temperature and length of reaction time. In attempting to correlate these factors and develop processes for producing urea-form fertilizing compositions, U.S. Patent No. 2,592,809, Kralovec, describes a process for producing thin films of urea-form not exceeding ¼ inch in thickness on a revolving drum and U.S. Patent No. 2,644,806, Kise, describes a cyclic process using a filter wheel.

The effect generally of reaction temperature as affecting the final product has been discussed by K. G. Clark et al. (K. G. Clark, J. Y. Yee, and K. S. Love, "New Synthetic Nitrogen Fertilizer," Industrial and Engineering Chemistry, vol. 40, No. 7, pp. 1178–1183 (1948); K. G. Clark et al., "Preparation and Properties of Urea-Form," Industrial and Engineering Chemistry, vol. 43, pp. 871–875 (1951). However, the problem of strict control of film or layer temperature within certain optimum ranges from the initial polymer mix through acid catalysts up to neutralization has not been taught by the prior art. Likewise, the addition of non-ionic surface active agents to the polymer mix as well as to the moving surface on which the polymerization reaction occurs prior to such polymerization has not been taught in the prior art.

Therefore, it is an object of this invention to provide an improved process for the manufacture of urea-form compositions by controlling the temperature of the polymerization reaction of a layer or film of the unpolymerized or partly polymerized material on a continuous elongated moving surface within critical temperature range of from 40° to 58° C. and preferably within the range of 54° to 58° C.

Another object of this invention is to provide a method for producing a urea-form fertilizer having an improved solubility pattern which will increase over a period of time so that the urea-form produced is increasingly effective as a fertilizing agent in releasing nitrogen.

A still further object of this invention is to provide a method of controlling polymerization of a catalyzed urea-formaldehyde solution by holding the temperature under a maximum critical temperature of 58° C. while polymerizing the urea-formaldehyde solution in a film having a thickness of one-half inch or less.

A further object of this invention is to provide a process to control polymerization of a catalyzed urea-formaldehyde solution in film form so that heat can be extracted or supplied to the polymerization reaction so as to maintain a reaction temperature of between 40° and 58° C. throughout polymerization.

Another object of this invention is to polymerize a catalyzed urea-formaldehyde solution in film form, having a thickness of from one-sixteenth to one-half inch, under controlled temperature conditions in a continuous manner and to neutralize the polymerized product before drying so as to arrest polymerization thereof.

Still another object of this invention is to dry a neutralized, polymerized urea-formaldehyde product under such conditions that a portion of the residual moisture is removed at a temperature of about 80° C.

A further object of this invention is to provide for the addition of a non-ionic surface active agent to the urea-formaldehyde monomeric liquid mix prior to polymerization to reduce agglomeration and prevent over-heating.

A still further object of the invention is to provide for the application of a poly-alkylene glycol intercondensate to the monomeric liquid mix prior to polymerization or to the continuous elongated moving surface prior to application of a catalyzed urea-form polymerizable reaction solution.

Additional objects of this invention will become apparent from an examination of the drawings, description and claims.

In this invention, it has been found that a solid urea-form fertilizer composition of extremely high quality and nitrogen availability for agronomic purposes can be made by maintaining a urea-formaldehyde monomeric solution during storage, catalyzation, and polymerization within a critical temperature range so that the heat of reaction or the heat necessary to support the reaction during polymerization is maintained at all times within the temperature range of 40° to 58° C. By controlling the process within this critical temperature range, it has been found that a urea-form product is produced in which the total nitrogen available to the soil exceeds that of urea-form materials produced by other processes heretofore known to the art.

A clearer understanding of certain features of this invention may be had by reference to the drawing showing in diagrammatic perspective view an apparatus for carrying out the present process.

According to one aspect of the invention, the urea-formaldehyde monomeric solution or liquid mix maintained at a pH of 7 to 9 is agitated and maintained in a holding tank 11 at a temperature of about 58° C. The temperature of the monomer is controlled by a jacket 12 surrounding tank 11 which supplies heat dissipated by the negative heat of solution which occurs when the urea and formaldehyde are mixed together. The urea-formaldehyde monomeric solution mixed and stored in the holding tank is pumped from the tank through a suitable discharge line 13 by a proportioning pump 14 which serves to meter the amount required. The urea-formaldehyde monomeric solution is conveyed through line 15. An acid catalyst, such as $H_3PO_4$ necessary to catalyze the urea-formaldehyde reaction is held in tank 16 and is pumped through line 17 to metering pump 18 where it is introduced into line 15. Alternatively, such acid catalyst may be selected from any suitable mineral acid such as $H_2SO_4$, HCl, $HNO_3$, etc., and sufficient catalyst is added to reduce the pH to a range of about 2.0 to 4.0. The urea-formaldehyde monomeric solution with the catalyst therein is thoroughly mixed by passing through a mixing pump 19 and out through a flared, elongated orifice 20 which serves to spread the catalyzed polymerizable solution across the surface of a continuous elongated moving belt 21 in the form of a film or layer 22 of predetermined thickness.

The belt is so designed that it moves at a speed to allow the polymerizable film to complete its polymerization as it passes through a heat controlled stage to assure that the requisite temperature of the film is at all times maintained within the critical range of 40° to 58° C., which is recorded by temperature recorder 23. The heat control stage provides for heating elements 24 which supply heat when it is necessary to bring the film temperature to the desired reaction temperature, that is, when the reaction is proceeding endothermically or when heat is necessary to trigger the reaction. A cooling means 25 is provided for extracting heat when the reaction becomes exothermic so that the reaction temperature never exceeds the maximum critical temperature of 58° C. and a fan 26 is provided to effect cooling of the film immediately upon introduction of the film onto the belt.

After the film 22 has remained on the moving surface for a period of time necessary to complete polymerization thereof, it is removed from the belt by a doctor blade 27 which scrapes the polymerized material into a hopper 28 from which it passes into a neutralizing vessel 29. Ammonia gas held in a tank 30 is fed through line 31 at a controlled rate so that the requisite amount of ammonia is supplied to the polymerized urea formaldehyde collected in vessel 29 to effect complete neutralization of the product. The neutralized, polymerized product is then passed from the ammoniator to a drying oven 32 where the residual moisture is removed. Drying is conducted in three or more stages to prevent the harming of the product which would result in reduced activity. The first drying stage is conducted at a temperature not greater than 80° C. until approximately 50% of the existing moisture in the product has been removed. After this stage, the temperature is increased to about 100° C. and gradually raised in stages until the desired amount of moisture has been removed.

It has been found that in the continuous process of this invention, the time required to complete polymerization is governed by four variables, namely:

(1) Temperature of application of the catalyzed, polymerizable urea-formaldehyde solution;

(2) pH of the catalyzed polymerizable urea-formaldehyde;

(3) Thickness of the polymerizable film;

(4) Temperature of film through polymerization.

In general, the time required to complete polymerization of the catalyzed urea-formaldehyde solution can be determined in the main by two variables, namely, temperature of the film and pH of the solution. Thus, for example, at a solution pH of 3 and a film temperature of 58° C., the time required to complete the reaction is approximately 3 minutes. At a solution pH of 3 and a film temperature of 40° C., the time required to complete the reaction is approximately 7.5 minutes. Thus, it can be seen that film temperature greatly affects the length of time for polymerization. At lower temperatures, of course, either a slow moving or a long belt would be required, which would be an economic factor in production.

Film thickness also plays an important part in the effect of temperature. For example, with a film thickness of 1/16 inch, practically no temperature rise is noted at the time the urea-formaldehyde solution is introduced onto the moving surface, but within a short period of time, there is a noticeable drop in film temperature to about 50° C., indicating that considerable atmospheric dissipation of heat has occurred. When the urea-formaldehyde solution is applied to the moving surface at a pH of 3 and temperature of 58° C. in a film thickness of approximately ½ inch, there is a noticeable rise in temperature to about 80° C., which far exceeds the temperature range for the process of this invention. Consequently, rapid cooling of the film must be accomplished in order to hold the temperature of the film within the critical range of this invention to produce an improved product.

It has been found that thicknesses up to 1/8 inch require no external cooling to hold the temperature of polymerization below the 58° C. maximum. In fact, some heating in some cases is necessary to maintain the temperature within the critical range of 54° to 58° C. for the period of time necessary to complete the reaction. When the film thickness is materially increased beyond 1/8 inch, external cooling is required to dissipate heat in order to maintain film temperature below the critical 58° C. maximum. At thicknesses of more than ¼ inch, it becomes difficult to control the film temperature because the amount of heat that must be dissipated to hold the temperature within the desired range is considerable due to the exothermic nature of the reaction. It is obvious, therefore, that, from the standpoint of economics and equipment design, a film thickness of 1/8 inch is most desirable because it allows utilization of atmospheric conditions to dissipate excess heat that may be built up by exothermic reactions; and, in the case of very thin films, heat must be supplied to maintain desired temperatures.

As discussed above, the temperature at which the urea-formaldehyde solution is spread onto the moving belt should be in a range of 40° to 58° C., and preferably between 54° and 58° C. If, however, the acid catalyzed urea-formaldehyde solution has a pH of 3, the temperature at which the solution is applied to the moving surface may be in the range of 40° to 45° C. It will be necessary when operating in this low temperature range to heat the film, formed by the spreading of the solution on the belt, externally to trigger the reaction to a point where it becomes exothermic. At this point, heat will be given off during the reaction so as to supply the necessary temperature rise to complete polymerization of the film and still maintain the temperature within the critical range. The heating of the film externally, however, is rather hazardous because of the possibility of producing excessive heating in spots or localized heating, which results in a product that will have areas of decreased solubility pattern. From a practical production standpoint, therefore, it is more desirable to maintain the temperature of the urea-formaldehyde solution when applied to the belt in the upper range, preferably between 54° and 58° C. and to maintain this temperature throughout the reaction. This temperature range allows the reaction to be completed in the shortest possible time, which is from 2½ to 3 minutes for film of not more than 1/8 inch thickness.

The effect generally of the pH on the reaction of the catalyzed urea-formaldehyde solution has been disclosed by many investigators. In effect, the lowering of the pH with most processes tends to cause total insolubility and, therefore, unavailability of the urea-formaldehyde polymers. However, operation within the temperature range of the process set forth in this invention allows for lowering of the pH to as low as 2. The pH can also be as high as 4 and still give good results. At the higher pH, however, the longevity of the reaction and a slow-down in production of material is experienced. In actual practice a pH in the range of 2.8 to 3.2 is preferred and provides extremely satisfactory results. The pH of the alkaline urea-formaldehyde monomer before catalyzation will range from 7.0 to 9.0.

The speed at which the elongated moving surface travels is, of course, dependent upon the variables discussed above. It is apparent that, if the variables are so controlled that the reaction time requires about 3½ minutes to complete polymerization, then it is only necessary for the surface to travel at a rate of speed which will conveniently allow the material to be spread in a film of the required thickness on the elongated moving surface and for a distance necessary to complete the reaction in 3½ minutes. The equipment can be so designed that the requisite reaction time can be obtained with flow rate of solution regulated to provide the optimum thickness to require the minimum reaction time.

During formation of the urea-formaldehyde monomer, either crude or crystal urea is employed as a raw material. The formaldehyde ingredient ordinarily is a 37% aqueous solution or a concentrated aqueous solution of about 60%. Urea-formaldehyde products in the form of concentrated solutions of a higher methylol urea derived for instance by reacting 4 to 6 mols of hot concentrated formaldehyde with 1 mol of urea at a pH of 7 to 9 according to a method disclosed in U.S. Patent 2,467,212, Kvalnes, are also suitable for use as a starting material in this invention. The advantage of employing highly concentrated methylol ureas is that they greatly increase the solids content of the end polymer thereby reducing drying costs. By utilizing concentrated methylol ureas, practically no formaldehyde is lost during the process.

The process of this invention, illustrating a dilute formaldehyde solution, proceeds as follows:

A 37% formaldehyde solution is buffered with a small amount of potassium hydroxide and to this buffered solution is added urea in sufficient quantity to bring the mol ratio of urea to formaldehyde within the range of 1.2 to 1.5. The mixture is maintained at a pH of between 8 and 9, and the temperature of the solution is maintained within the range of 40° to 58° C.

The monomeric solution thus prepared is introduced into a proportioning pump which continuously carries a controlled amount of solution to a dispersing pump. At a point in the line ahead of the dispersing pump, a quantity of phosphoric acid sufficient to reduce the pH of the monomeric urea-formaldehyde solution to a pH of 3.0 is introduced so that the dispersing pump mixes and disperses the solution through a spreading orifice onto a continuous, moving belt at a rate sufficient to maintain a thickness of between 1/16 and 1/8 inch. Immediately after the solution is deposited on the belt, it is passed under a cooling means to insure proper dissipation of the heat of reaction so that an undue rise in temperature will not occur. At this point, the temperature of the reaction is checked on a suitable recorder, such as a Dynalog electronic temperature recorder to insure that the temperature does not exceed 58° C. The exothermic reaction usually completes itself within a period of from 5 to 10 seconds after which heat must be supplied to assure that the film temperature is within the critical range. To accomplish the heating, the material passes under heaters (Chromalox strip heaters) which gently warm the polymer film so that it is maintained at a temperature of 58° C. during the life of the reaction, which is for a period of 2½ to 3 minutes.

After the reaction is completed, the material on the continuously moving belt is removed by ordinary scraping means, such as a doctor knife, and deposited in a cylindrical container which has been designed to allow the introduction of a neutralizing agent such as gaseous ammonia into the cylinder to effect a treatment of the solid material. The deposited polymer, being acid, is neutralized by the gaseous ammonia treatment to produce the fertilizer product. The product is then dried in controlled stages by conventional means in an air drier at temperatures which in the first stage do not exceed 80° C. and which do not exceed 200° C. in any stage. After the product has been dried, it is passed through conventional granulating, sifting and bagging operations to place it in condition for shipment to the trade.

Raising the pH of the monmeric urea-formaldehyde solution to an alkaline state of 8 to 9 may be accomplished by the incorporation of a suitable amount of a base, such as caustic soda. Caustic potash and potassium hydroxide have been used to raise the pH because of their evident plant food value.

Any mineral acid may be used to reduce the pH and provide the catalyst for polymerization of the monomeric urea-formaldehyde solution. Acids such as sulfuric or hydrochloric may be used, but phosphoric acid has been selected in the examples of this invention because of its evident plant food value.

It has been found that the incorporation of a non-ionic surface active agent of the ethylene oxide condensate type in about 1 to 5 pounds per ton of the urea-formaldehyde monomeric solution serves to prevent agglomeration and excessive heat formation during polymerization of the film where the film thickness approaches one-half inch. Preferred surface active agents incorporated into the urea-formaldehyde solutions of this invention are polyalkylene oxide ether and ester condensates. Specifically, an ethylene oxide ether condensate with an alkyl phenol such as Igepal CO-60 (Antara Div., General Dyestuffs), or Wooncopal EO (Woonsocket Color & Chemical Company) has been employed. The surface active agent serves principally as a conditioning agent to prevent agglomeration and excessive heat formation in layers approaching ½ inch thickness. The polyalkylene glycols of predetermined molecular weight incorporated in the liquid mix or applied to the elongated continuous moving surface are selected from intercondensates of lower alkylene glycols such as polyethylene and polypropylene glycols of molecular weight ranging from 750 to 5000. Specifically, polyethylene 750, polyethylene 2000, and polypropylene 750 and polypropylene 5000 (Union Carbide & Carbon Corp.) have been employed. It has also been found that spraying a 2% solution of a polyethylene glycol or polypropylene glycol having a molecular weight of from about 750 to about 5000 serves to prevent the polymerized film from adhering to the belt and consequently facilitates its removal.

The process of this invention is illustrated by the following examples:

Example I

Four hundred seventy pounds of 37% commercial formaldehyde was placed in a hold-up tank. A 6 normal potassium hydroxide was incorporated in the formaldehyde solution in sufficient quantities to bring the pH of the solution to 9.5. The alkalinized formaldehyde was heated to a temperature of 60° C. and 500 lb. of urea was added to the solution. Upon addition of the urea, the negative heat of the solution reduced the temperature of the urea-formaldehyde mix to 30° C. The urea-formaldehyde solution was reheated to a temperature of about 58° C. and maintained at this temperature for a period of 20 minutes. The prepared monomeric urea-formaldehyde solution was withdrawn from the holding tank by means of a proportioning pump which controlled the rate of monomeric solution delivered to processing. Into the metered monomeric solution delivered to processing, a measured amount of a 10% by volume phosphoric acid catalyst necessary to bring the pH of the solution to about 3.0 was delivered by a metering pump. The acidified urea-formaldehyde solution was passed through a positive displacement mixing pump where the solution was sprayed from a flared elongated orifice onto a continuous belt at a rate sufficient to form a continuous film of a thickness of about ⅛ inch. During polymerization, the film was first passed under an ordinary cooling fan to dissipate the initial heat of reaction caused by the addition of the acid catalyst. The temperature recorded during this stage of reaction was found to be 55° C. The polymerizable material travelling on the rubber apron was subjected to temperature recordation at one-minute intervals throughout its travel. Four temperature readings were recorded as follows:

(1) During the early stages of formation of the polymer film, or immediately after the material was spread on the belt, the temperature of the film was found to be 55° C.;

(2) One minute after spreading the film, the temperature recorded was 54.6° C.;

(3) After the second minute interval, the temperature recorded was 54.8° C.; and (4) After the third minute interval, the temperature was found to be 48° C., and the temperature dropped rapidly from this point on, indicating that the polymerization reaction was complete after about three minutes.

The material was allowed to remain on the processing belt for an additional time of 3 minutes before it was removed by a scraper blade preparatory to the neutralization step. After removal from the belt, the polymerized product was placed in the ammoniator and neutralized to a pH of about 7.5 with gaseous ammonia. The material was then removed from the ammoniator and dried in a conventional apron type air dryer in four different temperature stages in order to maintain the highest effective solubility pattern. To obtain the maximum AI value and still remove moisture from the product as rapidly as possible, the product was initially dried in a first compartment maintained at a temperature of 80° C. until approximately 50% of the existing moisture in the product had been removed. The material was then heated in a second compartment maintained at 100° C. where rapid drying took place without injury to the product. The product was then passed to a third and fourth compartment maintained at 110° C. The product removed from the drying oven was cooled, crushed, and bagged.

Final analysis of the product produced by the above process was as follows:

Total nitrogen _____percent__ 39.0
Water-insoluble nitrogen _____do____ 27.3
Hot water-insoluble nitrogen _____do____ 10.9
AI _____ 59.6
TA value _____ 100

Example II

The acidified urea-formaldehyde solution, as prepared in Example I, was sprayed on a continuous, moving belt at a temperature of 58° C. and at a rate sufficient to form a continuous film thickness of about ½ inch. Immediately after introduction of the material upon the belt, the surface of the film was rapidly cooled by applying ice water at 10° C. to the under surface of the processing belt to dissipate the heat formed during the exothermic polymerization reaction. The temperature of the moving layer of polymer was recorded as approximately 55° to 58° C. After a time lapse of approximately 1 minute, the material was allowed to proceed under atmospheric conditions to the end of the processing belt. The total reaction was complete in approximately 1½ minutes, however, for convenience, the material was allowed to remain on the belt for a total time of 7 minutes. The polymerized product was crushed after removal from the belt prior to neutralization by ammonia gas, as set forth in Example I, in order to insure complete neutralization of the product. The product was then dried, crushed, and bagged, as in Example I, to produce the marketable material. The product produced by this process had the following analysis:

| | |
|---|---|
| Total nitrogen _____percent__ | 39.0 |
| Water-insoluble nitrogen _____do____ | 29.25 |
| Hot water-insoluble nitrogen _____do____ | 16.08 |
| AI _____ | 45 |
| TA value _____ | 80 |

It is apparent that the process of Example II requires considerable cooling to dissipate the large amount of heat which is generated at the start of polymerization. The cost factor makes the process of Example I much more desirable from a production standpoint.

*Example III*

To the urea-formaldehyde monomeric solution prepared in Example I was added 3 parts by weight per ton of reactant solution a non-ionic surface active agent of an alkyl phenol-ethylene oxide condensation type, specifically identified as "Igepal CO–60" (Antara Div., General Dyestuffs). The reactant solution was catalyzed as in Example I and spread on a moving belt to form a film of a thickness of about one-half inch. The film was polymerized under the conditions set forth in Example II and the resulting polymerized product was found to have much less agglomeration and less heat had to be dissipated during polymerization.

*Example IV*

To the urea-formaldehyde monomeric solution prepared in Example I was added 3 pounds per ton of reactant solution of polyethylene glycol having a molecular weight of 750 to 2000. The resultant solution was then processed as set forth in Examples I and II and the resultant polymerized film was more readily removed from the processing belt after polymerization had been completed.

*Example V*

Immediately before the introduction of the catalyzed urea-formaldehyde solution, as prepared in Example I, to the processing belt, the belt was sprayed with a 2% solution of polypropylene glycol having a molecular weight of 750 to 5000 and the process was carried out as set forth in Examples I and II. The polymerized film produced from processing on the belt was easily removed at the end of the process.

*Example VI*

To 5000 pounds of urea-formaldehyde composition having the following analysis by weight:

| | Percent by wt. |
|---|---|
| Formaldehyde _____ | 59.0 |
| Urea _____ | 26.0 |
| Water _____ | 15.0 |
| Methanol _____ | 0.3 |
| Salts _____ | 0.2 | was added 7000 pounds of urea. The temperature of the urea-formaldehyde composition during the addition of the urea was 80° C. This temperature, however, soon dropped below 60° C. due to the negative heat of solution. The pH was maintained between 8 and 8.5 by addition of the required amount of potassium hydroxide. The highly concentrated solution of methylol ureas so produced was then withdrawn from the holding tank by a proportioning pump to a positive displacement mixing pump where sufficient phosphoric acid was added to reduce the pH of the urea-formaldehyde solution to 3.0. The positive displacement mixing pump provided the necessary mixing of the catalyst with the monomeric solution and distributed it evenly over a continuous rubber belt in sufficient quantity to form a film thickness of ⅛ inch. The temperature at this point was recorded at 52° C. The resulting film was immediately subjected to cooling by a circulating air fan to dissipate heat as the temperature was found to have risen to 57.2° C. The film was then allowed to travel along with the belt for a period of 2 minutes with no added cooling or heating at the end of which time the temperature was found to be 52° C. At this point, the reaction appeared complete. The material, however, was allowed to remain on the belt for an additional 4 minutes before removal. After removal from the processing belt, the resulting polymeric product was subjected to neutralization, as set forth in Example I, with gaseous ammonia to obtain a pH of 8.0 and subjected to drying temperatures of 110° C. until the moisture content was reduced to 2%. The resultant product was then crushed and bagged. The product produced by this process had the following analysis:

| | |
|---|---|
| Total nitrogen _____ | 38.6%. |
| Water-insoluble nitrogen _____ | 29.0%. |
| Hot water-insoluble nitrogen _____ | 12.4%. |
| AI _____ | 57. |
| TA value _____ | Greater than 100. |

Polymer films produced with 37% formaldehyde by this method contain 40% moisture. Analysis of the polymer film produced in Example VI using highly concentrated methylol ureas showed the presence of only 5% moisture. The advantage of this process is that it makes possible the use of initially higher temperatures in the range of 110° C. for drying.

The urea-form fertilizer compositions produced by the present process have been tested in field studies proceeding according to the method set forth in Armiger et al., Agronomy Journal 43, 123–127 (1951), "Urea-Forms." For example, composition studies were made between a urea-form prepared according to the present process (Nitroform, Woonsocket Color and Chemical Co., Rhode Island), and two other urea-form compositions. The results showed that for application of Nitroform in the range 2 to 8 pounds per 1000 sq. ft., there was a significant elevation in the amount of nitrogen recovered from clippings of rye grass, especially in the period 2 to 8 weeks after application. The amount of nitrogen in mg. recovered consistently amounted to two or three times the amount recovered from each of the other two urea-form compositions. From the same field test, the dry weight of rye grass clippings during the period 2 to 10 weeks after application showed considerably higher values (mg. dry weight) for the urea-form produced by the present process than for the other urea-form compositions.

Finally, as an indication of critical increasing increments of nitrogen availability, the rye grass field tests showed that for the period 2 to 7 weeks, there was a consistently higher weekly increment percent of nitrogen released for a urea-form made by the present process than for two other urea-form products.

Having thus described this invention which includes such alterations, equivalents and substitutions as might be readily devised by a worker skilled in the art, it is not to be limited except by the following language and meaning in the appended claims.

Therefore, I claim:

1. A method for the production of solid urea-form fertilizer compositions from an alkaline liquid mix of urea-formaldehyde wherein the mol ratio of urea:formaldehyde is >1 which comprises acidifying said mix to a pH value of from about 2.0 to 4.0 to catalyze polymerization and immediately introducing said acidified liquid mix onto a continuous elongated moving surface to promote the formation of a urea-formaldehyde polymer layer not greated than about one-half inch thickness, maintaining the temperature of said polymer layer between 40° and 58° C. on said surface during reaction, removing said layer from said moving surface, neutralizing said removed layer, and drying said neutralized layer.

2. A method according to claim 1 in which said drying of the neutralized layer is accomplied at a temperature of about 80° C. until about 50 percent of the moisture therein has been removed therefrom, and then further drying the layer at a temperature of about 100° C. to effect removal of the remaining moisture.

3. A method according to claim 1 in which the temperature of the polymer layer is maintained between 54° C. and 58° C.

4. A method for the production of solid urea-formaldehyde fertilizer compositions having a urea/formaldehyde ratio of 1.2 to 1.5 from a urea-formaldehyde mix having a pH of 7.0 to 9.0, which comprises acidifying said mix to a pH of 2.8 to 3.2 to initiate polymerization and form a polymer, immediately introducing said polymer onto a continuous elongated moving surface in the form of a thin polymer layer not greater than ⅛ inch thickness, subjecting said polymer layer to temperature control to maintain the temperature of the layer in the range 54° to 58° C., and maintaining said temperature control for a period of from 2 to 3 minutes to substantially complete the polymerization reaction, removing said polymer layer from said moving surface, and neutralizing and drying.

5. The process for fertilizing soil with insoluble nitrogen which is active and slowly available to growing plants, which comprises incorporating in the soil in which said plants are grown an acid catalyzed urea-formaldehyde polymer composition having a urea/formaldehyde mol ratio >1, which polymer composition having been formed from an acidified mix of urea and formaldehyde having a pH value of from 2.0 to 4.0, said mix polymerized on a continuous elongated moving surface to form a layer not greater than about ½ inch thickness, said layer being maintained at a temperature of from 54° to 58° C. until polymerization has been substantially completed and then neutralizing and drying.

References Cited in the file of this patent

UNITED STATES PATENTS

| | | |
|---|---|---|
| 2,473,798 | Kienle et al. | June 21, 1949 |
| 2,592,809 | Kralovec et al. | Apr. 15, 1952 |
| 2,644,806 | Kise | July 7, 1953 |
| 2,830,036 | O'Donnell | Apr. 8, 1958 |